US011956136B2

(12) United States Patent
Biradar

(10) Patent No.: US 11,956,136 B2
(45) Date of Patent: Apr. 9, 2024

(54) SYSTEM AND METHOD FOR SCALABLE AND ACCURATE FLOW RATE MEASUREMENT

(71) Applicant: Arista Networks, Inc., Santa Clara, CA (US)

(72) Inventor: Rajshekhar Biradar, Bangalore (IN)

(73) Assignee: ARISTA NETWORKS, INC., Santa Clara, CA (US)

( * ) Notice: Subject to any disclaimer, the term of this patent is extended or adjusted under 35 U.S.C. 154(b) by 127 days.

(21) Appl. No.: 17/315,669

(22) Filed: May 10, 2021

(65) Prior Publication Data

US 2022/0311691 A1  Sep. 29, 2022

(51) Int. Cl.
*H04L 43/0894* (2022.01)
*G06F 16/22* (2019.01)
*G06F 16/245* (2019.01)
*H04L 43/062* (2022.01)

(52) U.S. Cl.
CPC ...... *H04L 43/0894* (2013.01); *G06F 16/2255* (2019.01); *G06F 16/245* (2019.01); *H04L 43/062* (2013.01)

(58) Field of Classification Search
CPC . H04L 43/0894; H04L 43/062; G06F 16/245; G06F 16/2255
See application file for complete search history.

(56) References Cited

U.S. PATENT DOCUMENTS

| | | | |
|---|---|---|---|
| 10,320,691 B1* | 6/2019 | Matthews | H04L 47/31 |
| 11,108,812 B1* | 8/2021 | Krishnan | H04L 45/64 |
| 2019/0014395 A1* | 1/2019 | Anand | H04L 9/3297 |
| 2020/0280518 A1* | 9/2020 | Lee | H04L 47/115 |
| 2021/0084530 A1* | 3/2021 | Song | H04L 43/04 |
| 2022/0007176 A1* | 1/2022 | Lindheimer | H04W 8/24 |
| 2022/0014473 A1* | 1/2022 | Matthews | H04L 47/2441 |
| 2022/0045972 A1* | 2/2022 | Aibester | H04L 47/10 |

* cited by examiner

*Primary Examiner* — Jeffrey M Rutkowski
*Assistant Examiner* — Christopher Nguyen
(74) *Attorney, Agent, or Firm* — Fountainhead Law Group P.C.

(57) ABSTRACT

Systems and methods for selectively generating a telemetry report to calculate a flow or bit rate are disclosed. The methods include calculating a hash value of a packet, using it as a key to query a bloom filter, and obtaining a packet count. If the packet count reaches a trigger value, a telemetry report is generated and sent, along with the ingress timestamp, hash value, and the packet count, to the collector for calculating the flow rate (or bit rate).

The collector compares the packet count and ingress timestamp of the packet of the first telemetry report with a second telemetry report, both reports being generated at various trigger values, and calculates the flow rate. If a hash collision is detected, the calculations are voided and an update to the hash function is suggested.

20 Claims, 11 Drawing Sheets

| Switch ID | Ingress Port | Timestamp | Flow Count |
|---|---|---|---|
| | Egress Port | | Flow Hash |

FIG. 7

SYSTEM AND METHOD FOR SCALABLE AND ACCURATE FLOW RATE MEASUREMENT

FIELD OF INVENTION

Embodiments of the present invention relate to measuring flow rate in a postcard-based telemetry environment.

BACKGROUND

In-band telemetry (INT) is a framework designed to provide an insight into network packet flow. Telemetry capable network elements along the path of the packet obtain packet processing details in real-time that may be used in making informed network decisions. The real-time packet data is also used for troubleshooting network issues related to traffic congestion, bandwidth utilization, latency, jitter, and packet loss.

Current systems deploy a few types of INT implementations. One such implementation is referred to as postcard telemetry or postcard-based telemetry. Network elements using this implementation mirror some of the packets received at its ingress interface and send the mirrored copy of the packet, with telemetry metadata collected at the network element, to a collector. Using this approach, metadata collected at the network element is not forwarded to the next hop and instead sent to the collector. The telemetry metadata collected allows the collector to construct an overall picture of the traffic flow.

Although INT can be used for a variety of network monitoring use cases, it lacks the capability to accurately measure the flow rate of the received packets. Accurate flow rate data is an important metric for monitoring traffic and troubleshooting traffic issues. For example, knowledge of accurate flow rate can be helpful in analyzing congestion, debugging delay of sensitive packet flows, and implementing metering. In existing traffic measuring mechanisms, such as sFlow, data packets sampling includes pseudo randomly selecting data packets and forwarding to the collector for measuring flow rate. Such inaccurate sampling methods result in providing inaccurate or insufficient picture of the traffic flow.

BRIEF DESCRIPTION OF THE DRAWINGS

The various objects and advantages of the disclosure will be apparent upon consideration of the following detailed description, taken in conjunction with the accompanying drawings, in which like reference characters refer to like parts throughout, and in which:

FIG. 7 is a block diagram of an exemplary data set that is sent with the telemetry report to the collector, in accordance with some embodiments of the disclosure;

DETAILED DESCRIPTION

Figure 1:
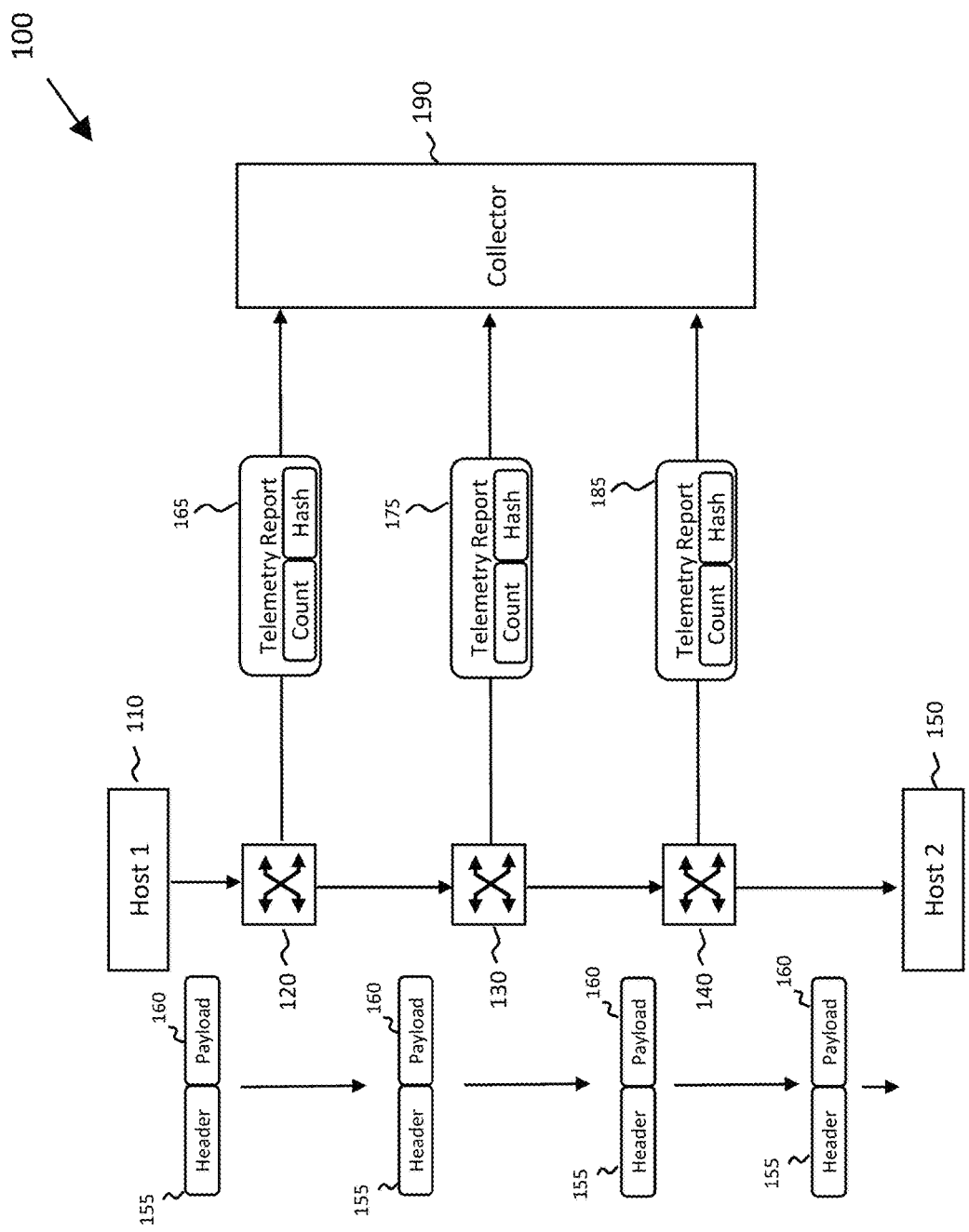
FIG. 1 is a block diagram of a postcard-based telemetry system and an exemplary path taken by a packet using the components of the postcard-based telemetry system, in accordance with some embodiments of the disclosure.

In accordance with some disclosed embodiments, systems and methods for measuring flow rate in a postcard-based telemetry environment are disclosed.

In accordance with some embodiments disclosed herein, the above-mentioned capability is achieved by selectively generating a telemetry flow report and forwarding the generated telemetry report, along with flow count and flow hash value, to a designated collector such that accurate traffic flow rate can be calculated. To accurately determine the flow rate, systems and methods are used for collecting packet data, generating telemetry flow reports, calculating traffic flow rate or bit rate, and taking corrective measurements when a hash collision from multiple flow is detected.

In some embodiments, a network element receives a first data packet having a header that includes 5-tuple parameters, also referred to as header parameters. These parameters are source IP address, destination IP address, source port, destination port, and protocol information. A hash value based on the 5-tuple is calculated for the received first data packet.

In some embodiments, the calculated hash value is used to query a bloom filter of the network element. The bloom filter is used to associate a received packet with a particular flow. When a first packet of a particular flow is received, the flow type of the first received packet is determined and recorded. All subsequent packets received are hashed and queried to determine if they belong to the same particular flow as the first received packet.

The bloom filter uses an 'in' bit wide bloom filter array where 'in' is the size of a counter. The bloom filter array is used for storing counters corresponding to hash values that define a set and it can be queried to get the counter associated with hash value of an incoming packet. In some embodiments, when a packet is received, it is hashed, and the hash value is used to query the bloom filter. If the packet is the first packet of a particular flow, then the bloom filter returns the query by providing an initial counter value. If the packet received is a subsequent packet and the bloom filter query results in associating the packet with the same flow as the first received packet, then the bloom filter returns the query with an incremented counter value. All packets received by the network element that are believed to belong to the same particular flow are counted and reported via the counter. Packets that are believed to belong to a different flow, such as a second flow, are counted and reported as part of a second flow. In some instances, if there is a hash collision between a first flow and a second flow, which is determined at the collector in one embodiment, then corrective action as described below in further detail may be taken. The counter starts at an initial value, such as zero or one, for the first packet received, and is incremented every time a packet that is believed to belong to the same flow is hashed and queried. If a determination is made that a received packet does not belong to the same flow, then the counter is not incremented.

In some embodiments, a predetermined value for the counter, also referred to as trigger value or counter trigger value is established. When the counter reaches the trigger value, a telemetry report is generated. The counter is triggered when a first packet of a flow is hashed by the bloom filter and then again when a subsequent packet of the same flow as the first packet is hashed and queried to return the predetermined trigger value. For example, the predetermined counter trigger value may be set at 1,000, also referred to as the second counter trigger. In this example, a telemetry report would be generated for the first data packet (e.g., first telemetry report) and then again at the $1000^{th}$ data packet (e.g., second telemetry report) of the same flow, also referred to as the first counter trigger and second counter trigger. A telemetry report is not generated for counter values that fall in-between the initial value (first counter trigger) and the second counter trigger value. The counter value is incremented for all packets hashed and queried and reset to its initial value once it reaches its counter trigger value, such as reset from 1000 back to 0 or 1 in the above example.

The generated telemetry flow report is forwarded to the designated telemetry collector. Along with the telemetry flow report, the calculated hash value and the flow count obtained from the counter is also forwarded to the collector. Additional data, such as the timestamp of the packet received at the ingress of the network element for which the telemetry report is generated, is also forwarded to the collector.

Once the collector receives at least two flow telemetry reports, such as, for example, a first flow telemetry report when the counter is at an initial value and a second flow telemetry report when the counter is at its counter trigger value, it performs a flow rate calculation. In another embodiment, the collector may be configured to calculate the flow rate after a predetermined number of telemetry reports are received.

In some embodiments, the collector compares the hash values between two flows, such as a five tuple from the first telemetry report and a five tuple from the second flow telemetry report, to determine if there is a hash collision. In the event of a hash collision (e.g., the five-tuples do not match), a flow rate is not calculated and the hash function associated with calculation of the hash can be updated to attempt to reduce future hash collisions. If a determination is made that the telemetry reports were based on the same flow, then the flow rate is calculated.

In some embodiments, multiple hashes are calculated for the same packet. This may be performed to reduce the probability of a hash collision with a packet from another flow. When multiple hashes are calculated, then a secondary check is performed by the network element to ensure that only the lesser of the multiple count values are used. For example, if the bloom filter in response to a first hash query returns a count value of 1000, in response to a second hash query return a count value of 1200, and in response to a third hash query returns a count value of 1300, then the count value of 1000, which is the lowest value among 1000, 1200 and 1300, determines whether to generate and send a telemetry report. Because the lowest of the count in this example is 1000, which is also set as a trigger point, the telemetry report is generated and sent to the collector with the lowest count value, the other count values, i.e., 1200 and 1300 are discarded, and the counter is reset for all the three count values by a predetermined number. For example, if the predetermined number is set to 1000, which would indicate that every $1000^{th}$ packet triggers a telemetry report, then the counter for count value 1000 would be reset to 1, the counter for count value 1200 would be reset to 201, and the counter for count value 1300 would be reset to 301, such that the next $1000^{th}$ packet can be used for determining whether to generate a telemetry report.

If the hash comparisons result in no hash collision, in some embodiments the collector calculates the flow rate using information received through the telemetry reports. The flow rate calculation includes calculating a difference between the first flow count, which is the flow count reported in the first telemetry report, and the second flow count, which is the flow count reported in the second telemetry report. The calculation results in providing the total number of packets received by the network element between the generation of the first and second telemetry report.

The flow rate calculation also includes calculating a time difference between an ingress timestamp of the first data packet and an ingress timestamp of a subsequent data packet for which a telemetry report was generated. The ingress timestamps identify a time at which the respective packets were received at the ingress port of the network element. The calculation results in providing the total time taken between the first packet and the $1000^{th}$ packet, or a packet at a predetermined number. The flow rate is then calculated by dividing the flow count differential by the time differential value to measure the traffic flow rate.

FIG. 1 is a block diagram of a postcard-based telemetry system 100 and an exemplary path taken by a packet using the components of the postcard-based telemetry system, in accordance with some embodiments of the disclosure.

System 100 includes Host 1 (110), receiving Host 2 (150), and a plurality of network elements 120, 130, and 140 in-between Host 1 and Host 2 that form a series of next hops along a route of the packet to its destination node, Host 2 (150). System 100 also includes a collector 190 that is the designated collector for the postcard-based telemetry system.

Although a certain number of network elements, and routes between the network elements are depicted, the system 100 for postcard-based telemetry is not so limited. It is understood that other types of network topologies that include different combinations of network elements and links, e.g., greater or fewer number of network elements, routers, and switches than shown in FIG. 1, may be employed to route packets and collect telemetry metadata from network elements encountered by the packet along its path to a destination.

The host 110 is connected to the first network element 120. In other embodiments there may be a combination of other devices, such as an edge element, a hub, or other network elements, servers or devices that are in-between the Host 1 (110) and first network element 120.

The host 110 may be a computer, server, mobile device, or other electronic device capable of routing and/or routing and embedding packets with INT data. When acting as an INT source, or INT header source, the host 110 functions to embed packets with an INT header that is used by downstream network elements to process telemetry metadata.

The first network element 120 may act as the ingress point or the first hop for a packet that is sent from Host 1 (110) that is destined for receiving Host 2 (150). The first network element 120 can be a switch, router, hub, bridge, gateway, etc., or another type of packet-forwarding device that can communicate with Host 1 (110) through a network. In another embodiment, the first network element 120 can also be a virtual machine.

Other network elements shown in FIG. 1, i.e., network elements 130 and 140 likewise can be a switch, router, hub, bridge, gateway, virtual machine or other types of packet receiving and forwarding devices. The plurality of network elements 130 and 140 are connected to each other and the first hop network element 120 and the last hop network element through a network (not shown).

Each network element 120, 130, and 140 is configured to receive and forward data packets. In INT embedded mode, it is also configured to read and follow INT instructions embedded in the header of an incoming packet and collect telemetry data that is generated at the network element. Some examples of the telemetry metadata, also referred to as metadata, collected by the network element include packet timestamps at ingress and egress points of the network element, path information, latency information, jitter, bandwidth utilization, queue depth, packet length, and other packet related data. The metadata collected represents the status of the packet and packet flow at the time it was processed by the network element. Once telemetry data is collected, the network element determines whether to send a telemetry report related to the currently received data packet to the collector or wait and send a telemetry report at a subsequent time relating to the subsequently received packet from the same flow.

In operation, as shown in FIG. 1, the first network element 120 receives a data packet from Host 1 (110). The received data packet includes a header 155 and payload 160. The network element 120 processes the data packet and collects metadata in accordance with the INT instructions provided in the packet header 155 or configured instructions in case of postcard-based telemetry. The network element 120 associates the data packet with a particular flow, such as first flow, and determines whether to generate a telemetry report and send it to the collector 190.

If the data packet received is the first data packet of a certain flow, such as flow 1, flow 2, or flow N, then the network element associates the first data packet with its flow and stores the association in the memory of the network element. When a subsequent packet is received by the network element 120, an analysis is performed to determine if the subsequent packet likely belongs to the same flow as the first packet or belongs to a separate flow, such as flow 2 or flow N. If the packet received by the network element 120 after receiving of the first packet belongs to the same flow as the first packet, then the network element 120 associates the received next packet with the same flow as the first packet and counts the next packet as the second packet belonging to the same flow. However, if the second packet belongs to different flow, such as flow 2, then the network element 120 associates the next data packet with flow 2 and its count is associated with flow 2 and not with flow 1.

As described in FIGS. 2, and 4-6, a telemetry report may be generated for selected data packets and not all data packets received by the network element 120. If a determination is made to send the telemetry report, then network element 120 sends telemetry report 165 which includes a flow count and a hash value associated with the received data packet.

Figure 2:
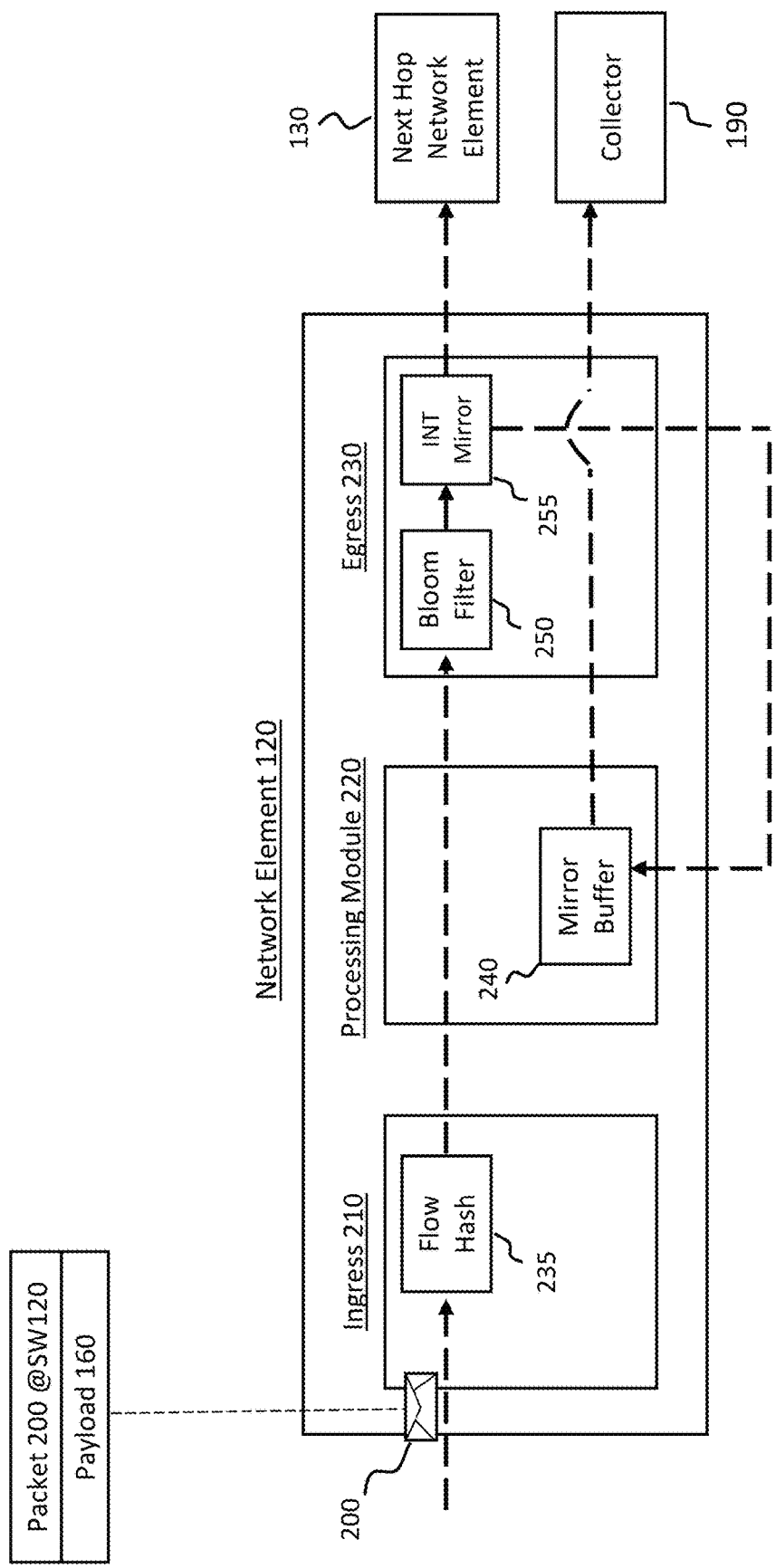
FIG. 2 is a block diagram of a data packet being processed by a network element, in accordance with some embodiments of the disclosure.

The network element 120 processes and mirrors the data packet, as described in FIG. 2, and forwards the received data packet to network element 130, which is the next hop along the data packet's path to its destination Host 2 (150). The forwarded data packet 200 includes the header 155 and payload 160 (as shown in FIG. 1). In one embodiment, when an INT embedded implementation is used, the header contains the INT instructions to collect telemetry metadata.

Likewise, network element 130 processes the data packet and then forwards the data packet to network element 140, which is the next hop along the data packet's path to its destination Host 2 (FIG. 1, 150). Finally, network element 140, processes the data packet, removes any metadata in case of INT embedded mode, and forwards it to its destination node, Host 2 (150).

The processes described above calculates a flow rate across a specific single network element, such as network element 120. When calculating the flow rate across a specific network element, telemetry reports (first and second telemetry report) sent by the specific network element, and the data included within the telemetry reports, are used by the collector to calculate the flow rate across the specific network element.

Any of the network elements along the path of the data packet may be selected to calculate flow rate. Regardless of which network element is selected, or if more than one network element is selected, the flow rate is calculated across each specific single network element selected.

Either only one specific network element may be selected to calculate flow rate or multiple network elements may be selected to calculate flow rate across each selected network element. For example, if network elements 130 is selected, then a flow rate across network element 130 is calculated, if network elements 140 is selected, then a flow rate across network element 140 is calculated, if multiple network elements 130 and 140 are selected, then a flow rate across each network element is calculated separately and the flow rate reflects the flow rate across a single network element.

If next hops network element 130 and 140 are selected, then next hop network elements 130 and 140 each perform a similar analysis, as network element 120, in processing the data packet. This includes associating the packet with a particular flow, determining the flow count of the data packet with respect to the particular flow, and determining whether to generate a telemetry report that can be sent to the designated collector 190.

If a determination is made to send the telemetry report, then network element 130 sends telemetry report 175 and network element 140 sends telemetry report 185, where each telemetry report sent includes the flow count at the network element at which the data packet is processed and a hash value associated with the received data packet. Although one network element is shown to report a flow count, based on the requirements, one or more network elements can be configured to report the flow count.

In one embodiment, the collector 190 receives telemetry reports for all the selected packets for which telemetry reports were generated. The collector calculates the flow rate as described in FIG. 8A based on the flow count and timestamp provided in each telemetry report. Having the exact flow count and timestamp allows the collector to accurately provide a flow rate calculation that can be used for network monitoring and troubleshooting. If the collector detects a hash collision between two separate flows, then corrective action may be taken as suggested by the collector. In other embodiments, the collector is also capable of calculating the bit rate for the flow, as described in FIG. 8B, based on packet length and ingress time stamp data provided in the telemetry report.

FIG. 2 is a block diagram of a data packet being processed by a network element, in accordance with some embodiments of the disclosure. In one embodiment, network element 120 from FIG. 1 is used to describe the various modules used by the network element to perform various processing operations on the data packet received. Although network element 120 is depicted, other network elements can also be used to perform similar operations on the data packet. Additional modules and processing steps to process the received data packet by the network element are also contemplated.

In some embodiments, a data packet 200 is received at the ingress port 210 of the network element 120 and exits at egress port 230. The received packet 200 includes a header 155 and payload 160. In one embodiment, when an INT implementation is used, INT instructions instruct the network element 120 to collect telemetry metadata for the received packet. A timestamp that identifies the time at which the data packet 200 was received is associated with the packet and identified as the ingress timestamp.

A flow hash module 235 calculates the flow hash for the data packet 200. In some embodiments, the flow hash is calculated based on some or all the data packet's 5-tuple, i.e., its source/destination IP address, source/destination port number, and protocol, which is collectively referred to as a 5-tuple or header parameters. Alternatively, other combinations of data packet 200 parameters may also be used to calculate the flow hash for the data packet 200.

A plurality of modules, such as processing module 220, which may include mirror buffer module 240, de-parser module and traffic matrix module (not shown) may also be used to process the packet. For example, a de-parser module may be used to build data structures and the traffic matrix module may be used to determine the volume of traffic between Host 1 and Host 2.

Figure 3:
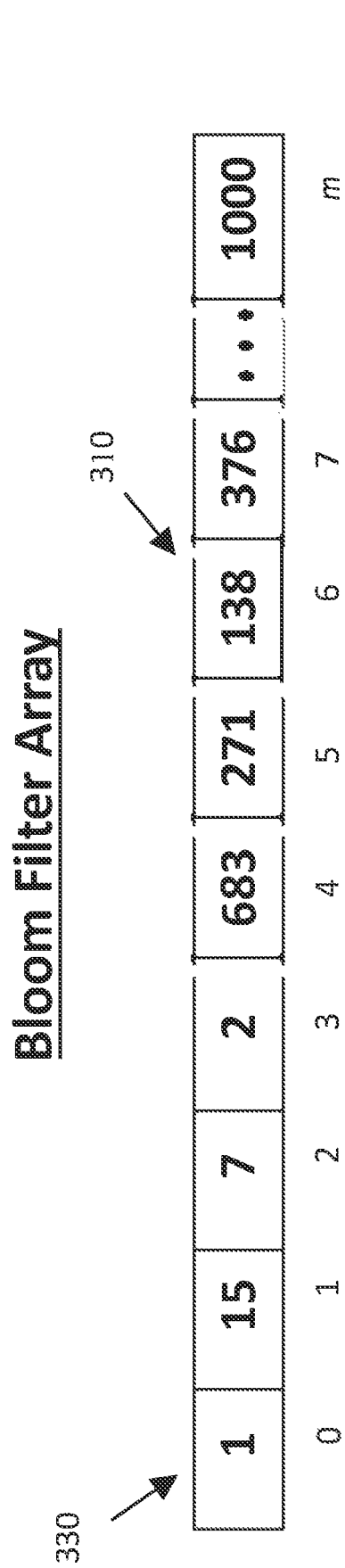
FIG. 3 is a block diagram of a bloom filter array that is populated based on a hash function, in accordance with some embodiments of the disclosure.

The process further includes using a bloom filter module having a bloom filter array as described in FIG. 3 and an INT mirror module 255. As depicted, FIG. 3 is a block diagram of the bloom filter array that is populated based on a hash function, in accordance with some embodiments of the disclosure. In some embodiments, network element 120 generates a bloom filter 250 having an array 300 of m slots (310). The bloom filter is used to obtain a packet count.

In one embodiment, the bloom filter is used to determine whether the receiving data packet is part of the same flow or probably part of the same flow. If a hash of the data packet 200 is indexed in the bloom filter array, and the hash is unique (meaning there is no count already at the index), then it would indicate that the data packet is part of a new flow. If the hash of the packet is indexed in the bloom filter array, and the hash is not unique (meaning the count is incremented), then that would indicate that the packet may be part of a previously seen flow. The uncertainty, i.e., may be part of the same flow, arises from the probabilistic nature of the bloom filter that returns a false positive when two or more flows hash to the same value of the bloom filter array. Steps can be taken to reduce such collisions, such as by modifying hash functions and/or using multiple hash functions simultaneously (further described below).

In another embodiment, the bloom filter is used to obtain a packet count. As such, the bloom filter array of m slots is initialized by populating each slot 310 of the array based on a hash function; the bloom filter array example is shown in FIG. 3. For example, an element is fed into a hash function and based on the result of the hash calculation, the hash value points to a slot in the bloom filter array. The slot stores a counter that provides a flow count value (330). For example, slot 0 has a flow count value of 1, slot 4 has a flow count value of 683, and slot m has a flow count value of 1000.

At the outset each slot of the array has a flow count value of "0" and the value is changed/updated as elements are added to the array. To add an element or define a data set for the bloom filter, a hash function is used. When populating the bloom filter array, each slot populated is selected based on the hash value, also referred to as the key. The slot to which the key points have a counter that is incremented by 1 representing the flow count of each packet received. Alternatively, the slot to which the key points have a bit counter that is incremented by the bit length of each packet received.

Once the bloom filter array is populated, a new incoming packet is hashed using a hashing function to calculate a hash based on the selected packet parameters, such as 5-tuple. The hash returns a key that is then used to query each slot of the bloom filter array and check its value.

Referring back to FIG. 2, a determination is made whether to generate a telemetry report for the data packet 200. The determination is based on the results of the bloom filter process applied by the bloom filter module 250 to the data packet 200. As explained further in FIGS. 4 and 5 below, if the bloom filter returns a counter value that is equivalent to a trigger value, then a telemetry report is generated and sent to the collector 190. If the bloom filter returns a counter value that is not a trigger value, then a telemetry report is not generated.

Figure 4:
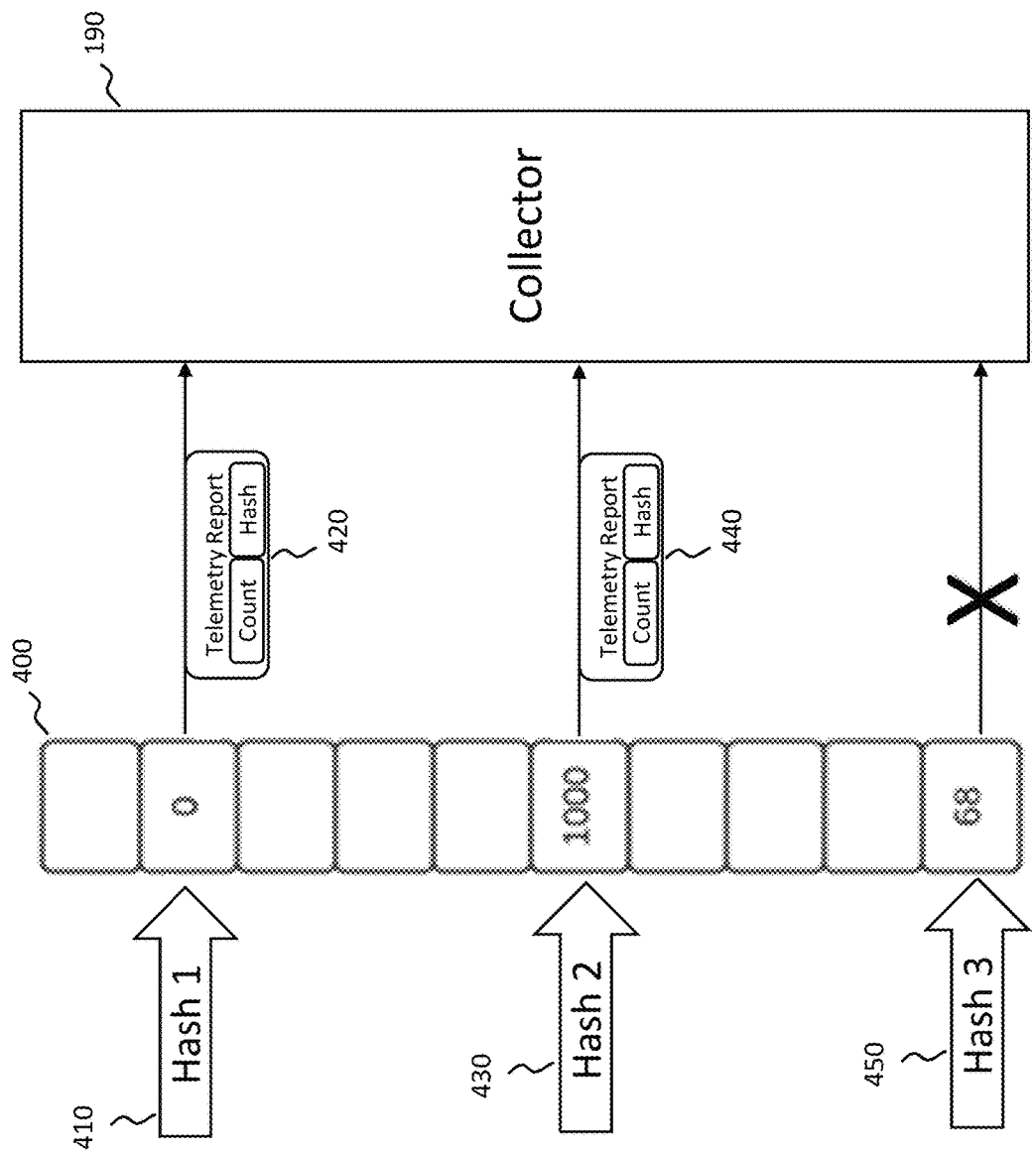
FIG. 4 is a block diagram of a bloom filter returning a count value that is equivalent to a trigger value for generating a telemetry report, in accordance with some embodiments of the disclosure.

FIG. 4 is a block diagram of a bloom filter returning a count value that is equivalent to a trigger value for generating a telemetry report, in accordance with some embodiments of the disclosure.

In FIG. 4, an initial packet is received. The initial packet is hashed based on its 5-tuple parameters resulting in Hash 1 (410). The hash indexes the bloom filter array to determine a match. As explained earlier in FIG. 3, the Bloom filter 400 includes a plurality of slots where each slot is indexed to a count value.

Upon successful query of Hash 1 with a slot of the bloom filter array the indexed count value associated with the matching slot is returned by the bloom filter. A first predetermined trigger value is set for an initial packet of a flow and subsequent trigger is set after a certain number of packets. For example, as shown, the first trigger is set at "0" and subsequent triggers are set every "$1000^{th}$" packet. This means that first packet and then every $1000^{th}$ packet activates a trigger.

As shown in FIG. 4, Hash 1, which is the hash for a first packet associated with flow 1, activates the trigger and a telemetry report 420 is sent to the collector 190. Once the telemetry report is sent to the collector, upon receiving a $2^{nd}$ packet of the same flow, the counter value is incremented "1" to "2" thereby indicating that this is the $2^{nd}$ packet from the same flow. Packets are counted until the second trigger at 1000 is activated.

Hash 2 (430) represents a hash calculated based on a 5-tuple on the 1000$^{th}$ packet associated with flow 2. Because the 1000$^{th}$ packet hits the trigger value of 1000, a telemetry report 440 is sent to the collector 190. Once the telemetry report 440 is sent to the collector 190, the counter value is reset back to "1" to repeat the process.

Hash 3 (450) represents a hash calculated based on a 5-tuple on the 68$^{th}$ packet associated with flow 3. Because the counter trigger value is set at 1000, and Hash 3 is based on the 68$^{th}$ packet which neither activates the 1$^{st}$ trigger (for the first packet) nor the second trigger (for the 1000$^{th}$ packet), a telemetry report is not generated. The counter value is updated to account for the 68$^{th}$ packet and when the counter value reaches 1000 again, then the next telemetry report is sent to the collector.

Figure 5:
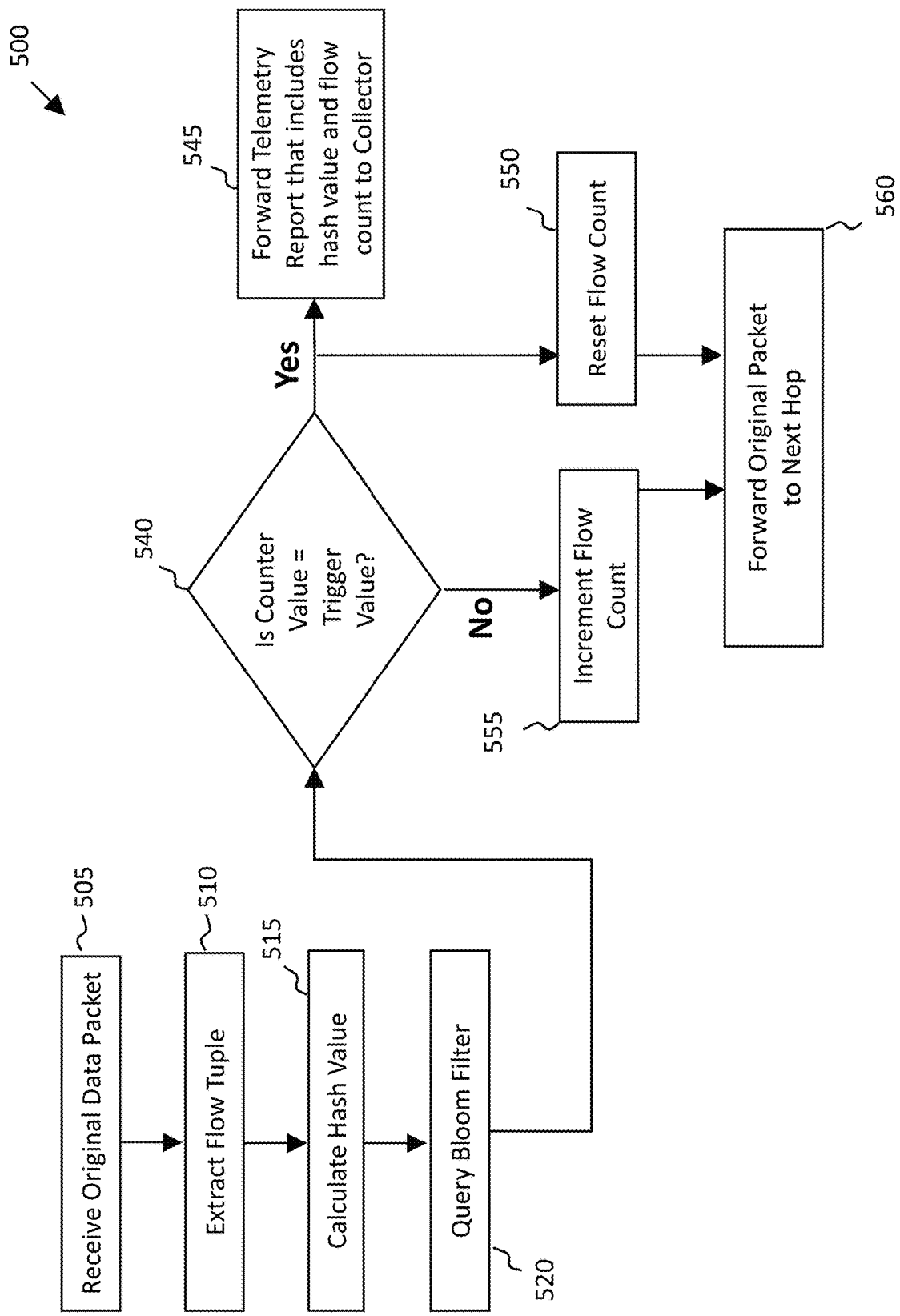
FIG. 5 is a flowchart of a process performed by a network element for generating and sending a telemetry report, in accordance with some embodiments of the disclosure.

FIG. 5 is a flowchart of a process performed by a network element for generating and sending a telemetry report, in accordance with some embodiments of the disclosure. In some embodiments, the process 500 is used by the network element to report flow count and hash values in a telemetry report such that accurate flow rate or bit rate can be calculated by the receiving collector.

The process 500 starts at block 505 when a data packet is received by the network element. In an embodiment, the data packet includes an INT header with embedded INT instructions. These instructions guide the receiving network element on the type and quantity of telemetry data to collect. Some examples of the telemetry data, also referred to as metadata, include packet time stamps at ingress and egress points of the network element, path information, latency information, jitter, bandwidth utilization, queue depth, and other packet related data. The collected telemetry metadata represents the status of the packet at the time it is processed by the network element.

The data packet is received at the ingress port of the network element and a timestamp of the receipt is recorded. The first network element can be a switch, router, hub, bridge, gateway, etc., or another type of packet-forwarding device that can communicate with a host and next hop network element to receive and forward the data packet.

At block 510, the data packet's tuple parameters are extracted by the network element. These tuple parameters may be the 5-tuple parameters of the data packet, i.e., IP address, destination IP address, source port, destination port, and protocol information.

At block 515, a hash is calculated. The hash is based on the tuple parameters extracted from the data packet, such as the 5-tuple parameters. The hash may also be calculated based on a subset or combination of 5-tuple parameters or other parameters of the data packet. Hashing comprises applying a hash function to the 5-tuple parameters as an input. The application of the hash function results in returning a hash value that is a unique identifier of a shorter fixed length that can be used to specifically identify the 5-tuple.

At block 520, the hashed value is used as a key to query the bloom filter. Because the hash value points to a slot in the bloom filter that holds a counter, the query results in obtaining a flow count value from the pointed slot.

At block 540, the flow count value is compared to the trigger value, which is a predetermined value. In one embodiment, the trigger value can be the 1$^{st}$ packet and the 1000$^{th}$ packet. It may also be some other predetermined value, or a value based on a function. The predetermined value is used as the trigger point to generate a telemetry report and not generate a telemetry report for any count value that does not reach the trigger value.

In this example, the trigger value is set at "0" and "1000". This means that the first packet and then every 1000$^{th}$ packet of the same flow would trigger the generation of a telemetry report. At block 545, based on the trigger value being activated in block 540, a telemetry report is generated and sent to the collector. The telemetry report contains the hash value that was calculated from the 5-tuple and the flow count value, which would be 1000 in this example. Additionally, the telemetry report includes the timestamp at which the data packet was received by the network element. It may also contain details of the packet length. The information provided in the telemetry report allows the receiving collector to accurately calculate the flow rate or the bit rate of the flow.

At block 550, the flow count value is reset once a telemetry report is sent to the collector. The flow count value keeps track of the number of packets received that likely belong to the same flow. Tracking packets allows the network element to generate a telemetry report when a trigger value is reached, such as every 1000$^{th}$ packet or any other predetermined trigger value established. Once the flow count reaches 1000$^{th}$ packet, at block 550, the flow count value is reset to "0" such that it can start counting packets again until the next trigger value is reached. At block 560, the originally received packet at block 505 is forwarded to the next hop network element.

If at block 540, the flow count value does not reach the trigger value, then a telemetry report is not generated. Instead, at block 555, the flow count is incremented to account for the received packet. For example, if the trigger value is set at 1000 and the received packet happens to be the 68$^{th}$ packet from the same flow, then a telemetry report is not generated as the flow count has not reached 1000. Instead, the count value is incremented from 68 to 69, to account for the received packet, and the packet is forwarded at block 560 to the next hop network element.

At block 545, when a telemetry report is generated and sent to the collector, regardless of the telemetry report being associated with Flow 1, Flow 2, or Flow N, and regardless of it being associated with the initial packet of a flow or the 1000$^{th}$ packet of the flow, the telemetry report includes a hash value, a time stamp of the packet as it was received at the ingress port of the network element, and the flow count value associated with the received packet at which the telemetry report was generated. The hash value, time stamps, and count value are then used by the collector to calculate the flow rate of the packet flow.

Figure 6:
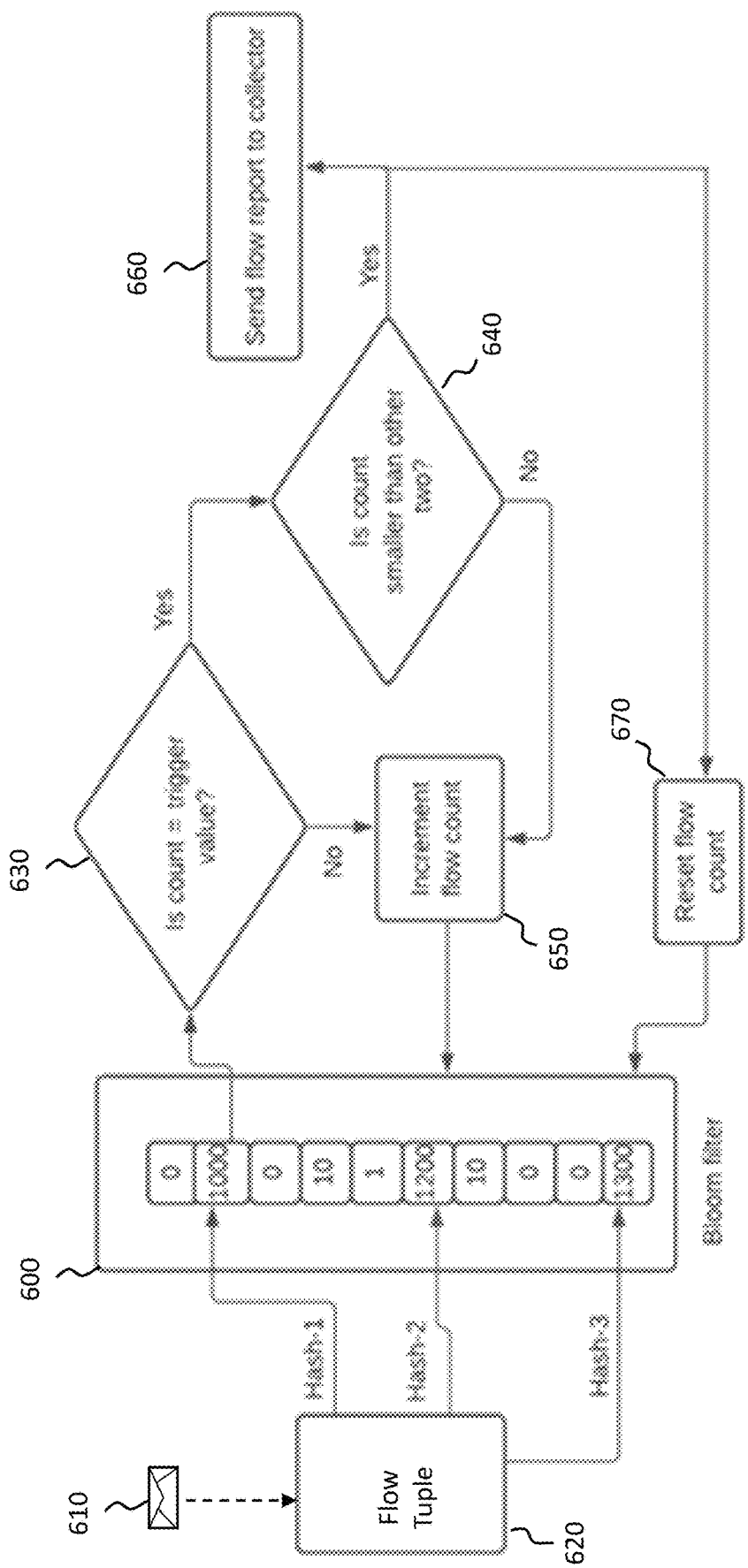
FIG. 6 is a flow chart of a process of generating multiple hashes for the same data packet and using the multiple hashes to determine generation of a telemetry report, in accordance with some embodiments of the disclosure.

FIG. 6 is a flow chart of a process of generating multiple hashes for the same data packet and using the multiple hashes to determine generation of a telemetry report, in accordance with some embodiments of the disclosure. In some embodiments, distinguishing from FIG. 4, which calculates a single hash value for each data packet received, FIG. 6 depicts multiple hash values calculated for the same data packet to reduce the probability of false positives and hash collisions.

As depicted in FIG. 6, multiple hashes are calculated for data packet 610. The data packet's 5-tuple parameters are used for calculating each hash. In some embodiments, three separate hash functions are used on the same flow tuple 620, which can be a 5-tuple, to calculate a hash value thereby resulting in three separate hash values for data packet 610, i.e., Hash-1, Hash-2, and Hash-3.

Each hash value, Hash-1 to Hash-3 is used as a key to query each slot of the bloom filter array. Because each hash value is different, the resulting counter values returned by the bloom filter 600 are also separate from each other. For example, the bloom filter returns a counter value of 1000 when queried with Hash-1, the bloom filter returns a counter value of 1200 when queried with Hash-2, and the bloom filter returns a counter value of 1300 when queried with Hash-3.

At block 630, a determination is made if the counter value is equivalent to a trigger value, which is a predetermined value, such as 0 or 1000. If the counter value is equivalent to the trigger value, then a second determination is made at block 640. The second determination includes comparing all the counter values that were returned for the multiple hashes, such as for Hash-1, Hash-2, and Hash-3, and selecting the lowest of the three counter values.

In the absence of a hash collision from various recorded flows, all three hash queries would return the same value. An indication of a hash collision exists when different counter values are returned. The smallest among the three values is used because it has low probability of being corrupted due to hash collision. Nevertheless, in an embodiment, the ultimate test of hash collision is performed by the collector.

At block 640, if the counter value that is the lowest of the three counter values is a trigger value, then a telemetry report is generated at block 660 and sent to the collector with the flow count and the hash value that is associated with the lowest of the counter values. As depicted in FIG. 6, the count value 1000 is less than the other two count values 1200 and 1300, as such a telemetry report is generated and sent with Hash-1 and flow count as 1000. Once the telemetry report is sent, the flow count is reset at block 670 to restart the sequence of counting packets. If at block 640, the count value is not the lesser of the three count values, then the flow count is incremented at block 650 and a telemetry report is not generated.

FIG. 7 is a block diagram of an exemplary data set that is sent with the telemetry report to the collector, in accordance with some embodiments of the disclosure. In addition to the original packet header sent in its payload, the data set sent with the telemetry report includes the switch ID, port ID of the ingress at which the packet was received, port ID of the egress from which the packet was forwarded, a timestamp of receiving the packet at the ingress port, flow count, and flow hash. The flow count and flow hash sent are specific to the packet received for which the telemetry report is generated.

Figures 8A, 8B:
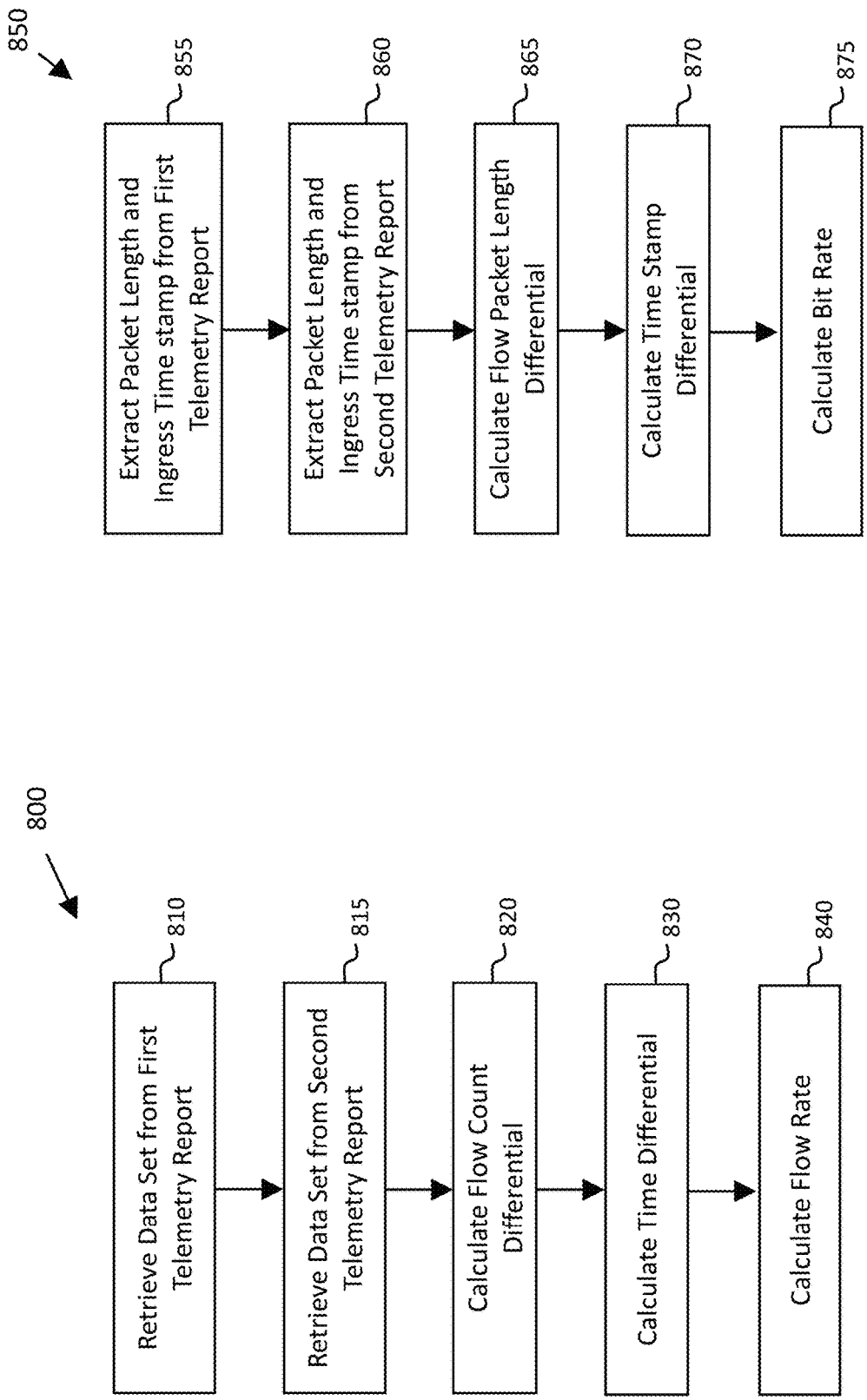
FIG. 8A is a flow chart for calculating the flow rate of a packet flow, in accordance with some embodiments of the disclosure.
FIG. 8B is a flow chart for calculating the bit rate of a packet flow, in accordance with some embodiments of the disclosure.

FIGS. 8A and 8B are flow charts for calculating the flow rate and bit rate of a packet flow, in accordance with some embodiments of the disclosure. The calculations are performed by the designated INT collector to accurately measure flow and bit rate.

The process 800 in FIG. 8A includes receiving a plurality of telemetry reports for the same flow. For example, the designated collector received a first telemetry report and a second telemetry report that is generated by the network element. At block 810, a data set from the first telemetry report is retrieved by the collector. The data set includes switch ID of the network element, port ID of the ingress at which the packet was received, port ID of the egress from which the packet was forwarded, a timestamp of receiving the packet at the ingress port, flow count, and flow hash. The data set is not so limited and may include other data that is included in the telemetry report.

In some embodiments, at block 810, the flow count and the ingress timestamp data from the first telemetry report are retrieved by the collector. The first telemetry report is associated with a first packet of a specific flow.

At block 815, the flow count and the ingress timestamp data from the second telemetry report are retrieved by the collector. The second telemetry report may include a data set, flow count, and flow hash calculated for the packet that triggered the second telemetry report. The data set may include parameters, such as switch ID of the network element, port ID of the ingress at which the packet was received, and port ID of the egress from which the packet was forwarded.

If the first telemetry report was generated for the first packet, then the second telemetry report received by the collector will be associated with the $1000^{th}$ packet, or another predetermined trigger value, of the same flow.

At block 820, the collector calculates the flow count differential between the first and the second telemetry report. The flow differential is the difference between the first flow count, which is the flow count reported in the first telemetry report, and the second flow count, which is the flow count reported in the second telemetry report. The calculation results in providing the total number of packets received by the network element between the generation of the first and second telemetry report. For example, the flow count differential in FIG. 4 between the first and second telemetry report would be 1000 data packets.

At block 830, the collector calculates the time differential between the first and the second telemetry report. This involves calculating a time difference between an ingress timestamp of the first data packet and an ingress timestamp of a subsequent data packet for which the second telemetry report was generated. The ingress timestamps identify a time at which the respective packets were received at the ingress port of the network element. The calculation results in providing the total time taken between the first packet and the $1000^{th}$ packet, or a packet at a predetermined number.

At block 840, the flow rate is calculated by dividing the flow count differential by the time differential value to measure the traffic flow rate.

A similar process 850 (FIG. 8B) may be used to calculate the bit rate of the flow. In some embodiments, ingress timestamp and flow bytes are sent in the telemetry report to the collector. At block 855, the ingress timestamp and flow bytes from the first telemetry report are retrieved by the collector. The first telemetry report may be associated with either a first packet of a specific flow or a subsequent packet that activated the trigger for generating the telemetry report.

At block 860, the ingress timestamp and flow bytes from the first telemetry report are retrieved by the collector. If the first telemetry report was generated for the first packet, then the second telemetry report received by the collector will be associated with the $1000^{th}$ packet, or another predetermined trigger value, of the same flow.

At block 865, the collector calculates the flow byte differential between the first and the second telemetry report. The flow byte differential is the difference between the flow bytes of the packet reported in the first telemetry report, and the flow bytes of the packet reported in the second telemetry report.

At block 870, the collector calculates the ingress time stamp differential between the first and the second telemetry report. This involves calculating the ingress time stamp difference as it was received at the ingress port of the network element. At block 875, the bit rate is calculated by dividing the total accumulated packet length differential by the time differential value.

Figure 9:
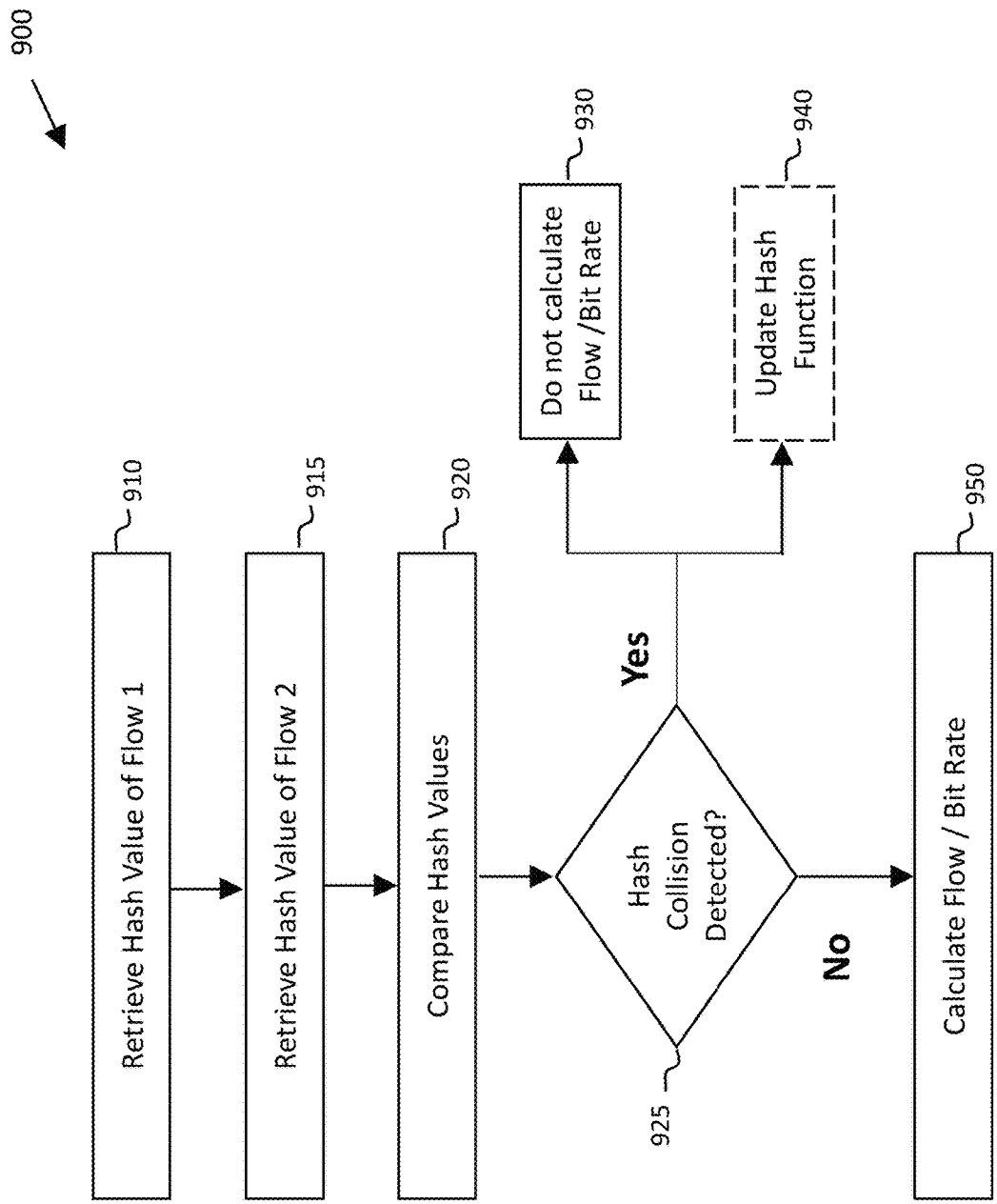
FIG. 9 is a flow chart for detecting a hash collision, by the collector, and taking corrective action, in accordance with some embodiments of the disclosure.

FIG. 9 is a flow chart for detecting a hash collision, by the collector, and taking corrective action, in accordance with some embodiments of the disclosure. In some embodiments, the network element uses the 5-tuple data of a packet, also referred to as header parameters, which is a large string of data, and converts them into a smaller string by hashing and associating it with a hash value. As such, there is a likelihood that two different sets of 5-tuple data of a packet are hashed to the same slot in the bloom filter array thereby causing a hash collision.

Figure 10:
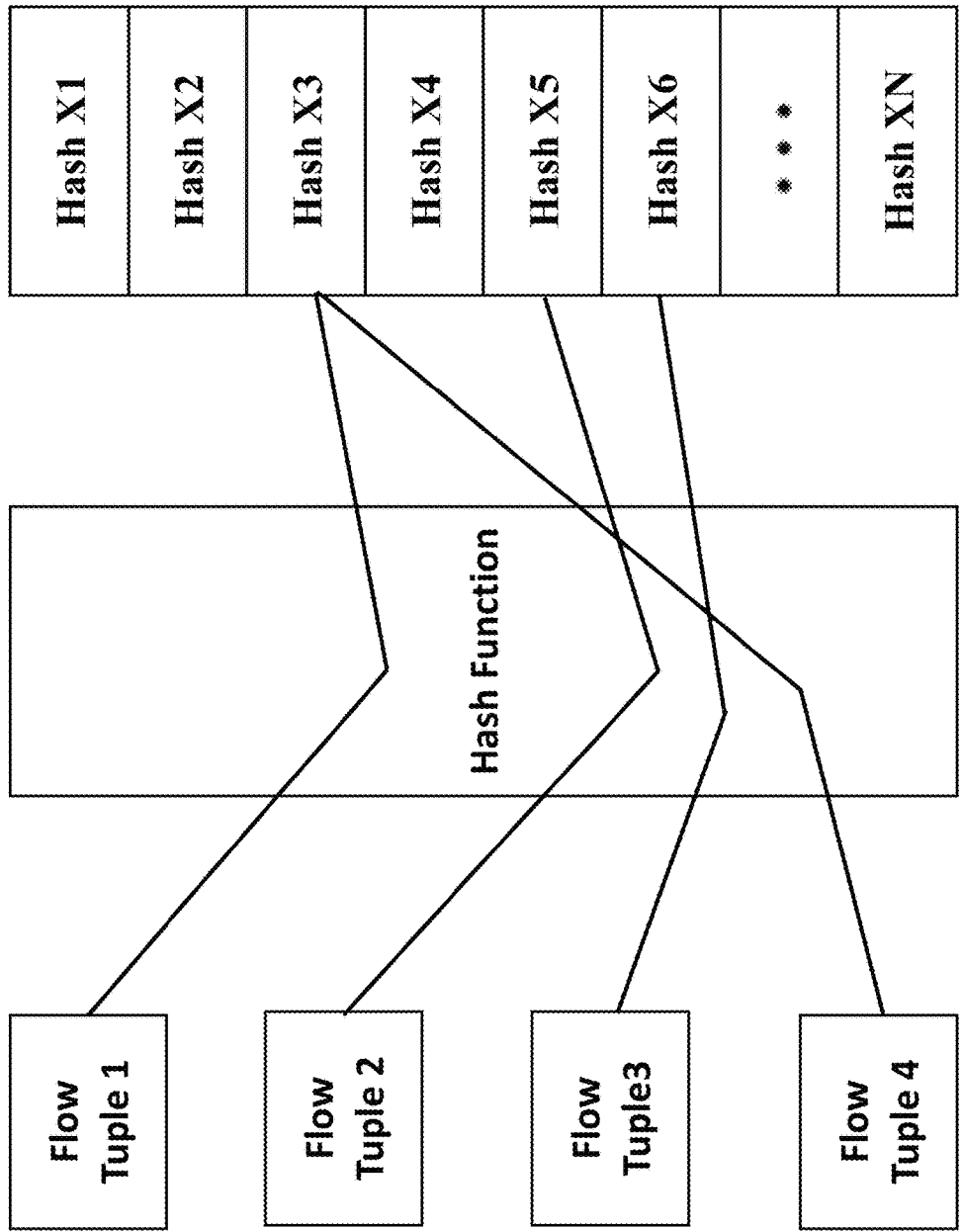
FIG. 10 is a block diagram of a hash map that maps flow tuples from different flows to a hash value, in accordance with some embodiments of the disclosure.

For example, as depicted in FIG. 10, a hash function applied to flow tuple 1, which is associated with a first flow, results in Hash X3. Likewise, hash function applied to flow tuple 2, which is associated with a second flow, results in Hash X5, hash function applied to flow tuple 3, which is associated with a third flow, results in Hash X6, and hash function applied to flow tuple 4, which is associated with a fourth flow, results in Hash X3.

As shown in FIG. 10, both first flow (as represented by hash tuple 1) and fourth flow (as represented by hash tuple 4) hash to the same slot in the bloom filter array, as represented by Hash X3, and cause a hash collision. FIG. 9 describes a process 900 of detection of such a hash collision between two different flows by the collector.

Process 900 at block 910 is initiated by the collector receiving a telemetry report for a first flow. The process includes extracting the hash value. It also includes extracting the 5-tuple of the packet from the telemetry report's payload field which helps the collector in associating the data packet with the first flow. As mentioned earlier, the hash value is generated based on a 5-tuple of a packet of the first flow.

At block 915, the collector receives a telemetry report for a second flow and extracts the hash value from the report. The hash value is generated based on a 5-tuple of a packet of the second flow. Collector also extracts the 5-tuple of a packet from the telemetry reports payload field which helps it to determine if the telemetry report is part of first flow or the second flow. This allows the collector to create a flow table that includes 5-tuple of a packet and/or its corresponding flow hash value as received from the telemetry report.

At block 920, the collector compares the hash value from the first flow with the hash value from the second flow and at block 925 determine if a hash collision is detected. If any hash values from any two or more flows are the same, then a hash collision is detected. For example, hash values may be stored in a hash table. The collector may compare hash values stored in the hash table for the first flow with hash values stored in the hash table for the second flow to determine if a hash collision is detected.

Another method of determining a hash collision includes storing the 5-tuple for the packets that are the subject of the generated telemetry report. For example, a 5-tuple for the $1^{st}$ and the $1000^{th}$ packet may be stored. The collector may use the 5-tuple from both the $1^{st}$ and $1000^{th}$ packet and compare them to each other to determine if the packets belong to the same flow.

At block 930, if a hash collision has been detected by the collector, then the collector does not calculate the flow or bit rate for the flows for which the collision is detected. This is because calculating flows that have hash collision may give inaccurate flow rate or bit rate values.

In some embodiments, optionally, at block 940, an update to the hash function used for calculating the hash is suggested. This may be a feedback loop between the collector and the network element where the collector provides the details of the hash collision to the network element and the network element continuously refines the hash function based on the feedback from the collector to reduce the probability of a hash collision in the future.

At block 925, if it is determined that a hash collision is not detected, then the collector calculates the flow and/or bit rate at block 950 as described in FIGS. 8A and 8B.

Figure 11:
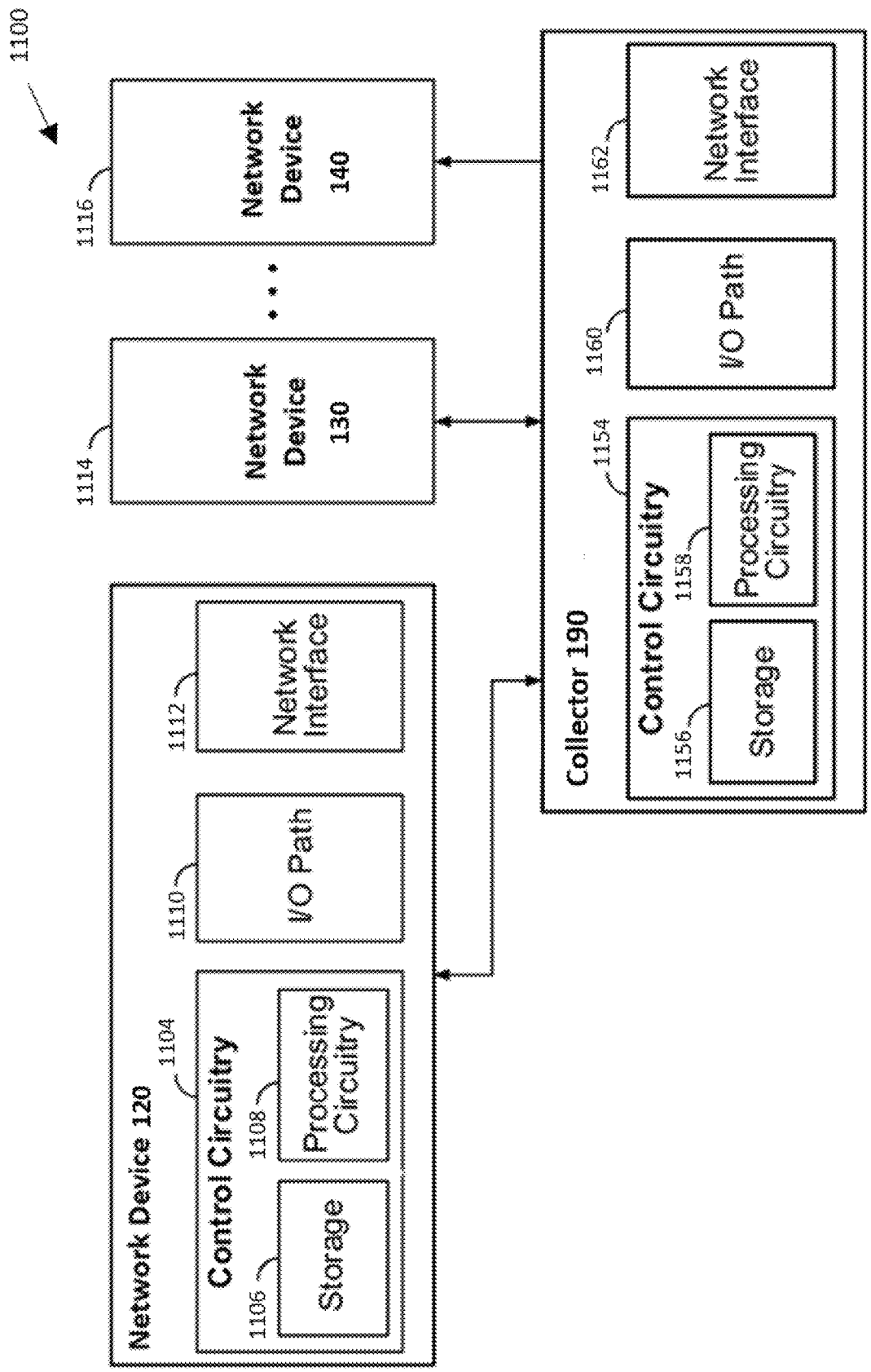
FIG. 11 is a block diagram of a telemetry system, in accordance with some embodiments of the disclosure.

FIG. 11 is a block diagram of a telemetry system, in accordance with some embodiments of the disclosure. The system includes an INT host 110, network elements 120, 130, and 140, INT receiver 150 (not shown), and a collector 190.

Network element 120 may receive and send data via an input/output (I/O) path 1110. I/O path 1110 is communicatively connected to control circuitry 1104, which includes processing circuitry 1108 and storage (or memory) 1106. Control circuitry 1104 may send and receive commands, requests, and other suitable data using I/O path 1110. I/O path 1110 may connect control circuitry 1104 (and specifically processing circuitry 1108) to one or more network interfaces 1112, which in turn connect the network element 120 to other devices on the network (e.g., network elements 130 and 140).

Control circuitry 1104 may be based on any suitable processing circuitry, such as processing circuitry 1108. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry is distributed across multiple separate processors or processing units, for example, multiple of the same type of processing units (e.g., two INTEL CORE i7 processors) or multiple different processors (e.g., an INTEL CORE i7 processor and an INTEL CORE i9 processor). In some embodiments, control circuitry 1104 executes instructions stored in memory (i.e., storage 1106). For example, the instructions may cause control circuitry 1104 to perform packet forwarding, creating a bloom filter data structure, hashing packet parameters, such as 5-tuple, determining flow count and hash value, generating telemetry reports, calculating flow rate and bit rate, detecting hash collisions, and other operations as described in this document.

Memory 1106 may be an electronic storage device that is part of control circuitry 1104. As referred to herein, the phrase "electronic storage device" or "storage device" should be understood to mean any device for storing electronic data, computer software, instructions, and/or firmware, such as random-access memory, hard drives, optical drives, solid state devices, quantum storage devices, or any other suitable fixed or removable storage devices, and/or any combination of the same. Nonvolatile memory may also be used. The circuitry described herein may execute instructions included in software running on one or more general purpose or specialized processors.

Control circuitry 1104 may use network interface 1112 to receive and forward packets to other network devices 1114-1116 (which may include hardware similar to that of network element 120), e.g., over any kind of a wired or wireless network.

Memory 1106 may include instructions for embedding packet headers with INT instructions, embedding instructions for a downstream network element to calculate packet transmission capacity, and handling INT packets to collect and forward telemetry data as described above.

Collector 190 may include I/O path 1160, network interface 1162, and control circuitry 1154 that includes processing circuitry 1158 and storage 1156. These elements may function similarly to elements 1104, 1106, 1008, 1110, 1112 as described above. Collector 190 may be configured to receive telemetry reports, hash values, flow count, timestamps from all networking elements in the network via network interface 1162.

It will be apparent to those of ordinary skill in the art that methods involved in the present invention may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

The invention claimed is:

1. A method of generating a plurality of telemetry flow reports in a postcard-based telemetry capable network, the method comprising:
   receiving, by a network element, a first data packet including a first header;
   calculating a first hash value from a plurality of first parameters of the first header;
   using the first hash value to query a bloom filter to obtain a count from the bloom filter, wherein the count represents a select number of packets received by the network element;
   incrementing the count obtained from the bloom filter;
   determining whether the count has reached an initial counter trigger; and
   in response to determining that the count has reached the initial counter trigger:
      generating a first telemetry flow report for measuring a traffic flow rate, wherein the first telemetry flow report includes the count and the first hash value, and forwarding the first telemetry flow report to a collector.

2. The method of claim 1, further comprising:
   receiving, by the network element, a second data packet including a second header;
   calculating a second hash value from a plurality of second parameters of the second header of the second data packet;
   obtaining the count using the second hash value calculated for the second data packet;
   incrementing the count;
   determining whether the count has reached a second counter trigger; and
   in response to determining that the count has reached a second counter trigger:
      generating a second telemetry flow report for measuring the traffic flow rate, wherein the second telemetry flow report includes the count and the second hash value calculated for the second data packet, and forwarding the second telemetry flow report to the collector.

3. The method of claim 2, wherein, in response to determining that the count has reached the second counter trigger, further comprising:
   resetting the count to an initial value.

4. The method of claim 1, wherein the first telemetry flow report further comprises an ingress time stamp, wherein the ingress time stamp is associated with a time at which the network element received the first data packet.

5. The method of claim 1, wherein the plurality of first parameters of the first header are selected from the group consisting of: a source IP address, a destination IP address, a source port number, a destination port number, and a protocol.

6. The method of claim 1, wherein the first hash value is an index to an array of the bloom filter.

7. The method of claim 6, further comprising:
   calculating a second hash value for the first data packet, wherein the second hash value is not the same as the first hash value;
   querying the bloom filter to obtain a second count associated with the second hash value; and
   selecting the lowest of the count between the count associated with the first hash value and the second count associated with the second hash value to become the count included in the first telemetry flow report.

8. The method of claim 7, further comprising:
   determining whether the lowest selected count has reached the initial counter trigger; and
   wherein when the lowest selected count has reached the initial counter trigger, the lowest selected count and the associated hash value are included in the generated first telemetry flow report.

9. The method of claim 1, wherein the collector measures the traffic flow rate using flow differential values and time differential values computed from received telemetry flow reports.

10. A method of measuring a traffic flow rate comprising:
    receiving, by a collector, a first telemetry report associated with a first data packet, wherein the first telemetry report includes a count, an ingress time stamp, and a hash value associated with the first data packet;
    receiving, by the collector, a second telemetry report associated with a second data packet, wherein the second telemetry report includes a count, an ingress time stamp, and a hash value associated with the second data packet;
    calculating a difference between the count from the first telemetry report and the second telemetry report to obtain a flow differential value;
    calculating a difference between the ingress time stamp from the first telemetry report and the second telemetry report to obtain a time differential value; and
    dividing the flow differential value by the time differential value to measure the traffic flow rate.

11. The method of claim 10, further comprising:
    comparing the hash value from the first telemetry report and the hash value from the second telemetry report; and
    in response to the hash values being equal:
    obtaining first header parameters from the first telemetry report, wherein the first header parameters are associated with the first data packet;
    obtaining second header parameters from the second telemetry report, wherein the second header parameters are associated with the second data packet;

comparing the first header parameters from the first telemetry report and the second header parameters from the second telemetry report; and in response to the first header parameters and the second header parameters not being equal:

discarding the measured traffic flow rate.

12. The method of claim 11, wherein a hash collision is determined when the hash values of the first telemetry report and the second telemetry report are equal and the first header parameters of the first telemetry report and the second header parameters of the second telemetry report are not equal.

13. The method of claim 12, wherein, in response to determining the hash collision:

updating a hash function that was used for calculating the hash value associated with the first data packet and the second data packet.

14. The method of claim 11, wherein, the first header parameters are selected from the group consisting of: a source IP address, a destination IP address, a source port number, a destination port number, and a protocol.

15. A postcard-based telemetry capable device comprising:

a network interface of the postcard-based telemetry capable device configured to receive a plurality of data packets; and a control circuitry connected to the network interface configured to:

receive a first data packet including a first header;

calculate a first hash value from a plurality of first parameters of the first header;

use the first hash value to query a bloom filter to obtain a count from the bloom filter, wherein the count represents a select number of packets received by the postcard-based telemetry capable device;

increment the count obtained from the bloom filter;

determine whether the count has reached an initial counter trigger; and in response to determining that the count has reached the initial counter trigger:

generate a first telemetry flow report for measuring a traffic flow rate, wherein the first telemetry flow report includes the count and the first hash value, and forward the first telemetry flow report to a collector.

16. The device of claim 15, wherein the control circuitry is further configured to:

receive a second data packet including a second header;

calculate a second hash value from a plurality of second parameters of the second header of the second data packet;

obtain the count using the second hash value calculated for the second data packet;

increment the count;

determine whether the count has reached a second counter trigger; and in response to determining that the count has reached a second counter trigger:

generate a second telemetry flow report for measuring the traffic flow rate, wherein the second telemetry flow report includes the count and the second hash value calculated for the second data packet, and forward the second telemetry flow report to the collector.

17. The device of claim 16, wherein, in response to determining that the count has reached the second counter trigger, the control circuitry is further configured to:

reset the count to an initial value.

18. The device of claim 15, wherein the first hash value is an index to an array of the bloom filter.

19. The device of claim 18, wherein the control circuitry is further configured to:

calculate a second hash value for the first data packet, wherein the second hash value is not the same as the first hash value;

query the bloom filter to obtain a second count associated with the second hash value; and select the lowest of the count between the count associated with the first hash value and the second count associated with the second hash value to become the count included in the first telemetry flow report.

20. The device of claim 19, wherein the control circuitry is further configured to:

determine whether the lowest selected count has reached the initial counter trigger; and wherein when the lowest selected count has reached the initial counter trigger, the lowest selected count and the associated hash value are included in the generated first telemetry flow report.

* * * * *